Patented May 26, 1925.

1,539,374

UNITED STATES PATENT OFFICE.

ROBERT LOW SMITH, OF ERITH, ENGLAND, ASSIGNOR TO VICKERS LIMITED, OF WESTMINSTER, ENGLAND.

MANUFACTURE OF DRILLS AND SIMILAR TOOLS.

No Drawing.     Application filed July 3, 1924.  Serial No. 724,036.

*To all whom it may concern:*

Be it known that I, ROBERT LOW SMITH, a subject of the King of Great Britain, of Vickers Limited, Erith Works, Erith, in the county of Kent, England, have invented certain new and useful Improvements in or Relating to the Manufacture of Drills and Similar Tools, of which the following is a specification.

This invention relates to the manufacture of drills and similar tools.

When manufacturing drills it is customary to point the drill prior to the hardening and tempering operations. This method is open to the objection that the point of the drill is liable to be unduly heated during the hardening and tempering operations.

According to the present invention two drills are formed from a steel bar of double drill length, after the bar has been hardened and tempered, by severing the bar at the middle, the severed ends being subsequently pointed and the usual cutting edges formed. Two drills are thus produced from a single bar of high speed or other high grade steel, and the aforesaid disadvantage associated with the manufacture of ordinary drills is avoided. The bar of double drill length being of uniform diameter, i. e., the points not yet having been formed, it can be evenly heated throughout its entire length during heat treatment. Some or all of the other usual operations performed in the production of an ordinary drill may also be effected prior to the bar of double drill length being severed at its middle. The high grade steel bar may have the shanks formed integrally therewith or the shanks may be made of mild or low grade steel and welded to the ends of the bar. The double drill lengths may either be formed from solid bars, twisted profile bars, or fluted forgings.

In manufacturing two drills from a high grade steel bar of double drill length to which mild or low grade steel shanks are to be attached we prefer to proceed as follows:—

A profile bar is cut to double drill length, twisted throughout its length, the ends are flattened and the outside diameter cleaned up. The shanks, which may be parallel and may be previously fluted at one end, are then attached to each end of the bar by electric welding. Thereafter the bar, with the shanks attached thereto, is annealed, straightened if necessary, and the outside diameter is turned, leaving the necessary grinding allowances for the drill portions. The shanks are then cleaned up, and the flutes are milled. The relief may then be milled or, if desired, the relief may be ground after the hardening operation. The bar is then hardened, tempered and straightened if necessary. Thereafter the bar is severed at the middle and the ends coned. The shank is now turned and the whole then ground to a finish.

The generally favoured practice of raising high speed steel drills as quickly as possible from pre-heating to hardening temperature is essential in order to obtain best results, and is particularly desirable when manufacturing drills which are to be employed under strenuous conditions. In practice, however, there is great difficulty and uncertainty about the rapid and uniform heating of high grade steel drills to any predetermined hardening temperature in the ordinary types of furnaces. The time taken to obtain the desired temperature is generally too long, especially with the larger sizes of drills, and the oxidation which results is not only objectionable in itself but it involves the generation of so much local heat that the results are rendered very unreliable. In addition to these defects, the usual methods of heating produce unevenness of temperature on account of surface absorption, with resulting tendencies towards excessive temperatures at the point and cutting edges of the drills, which can only be coped with in an unscientific and uncertain manner.

To remedy these defects the high grade steel bars of double drill length, may, if desired, be heated for hardening purposes and/or tempering purposes by means of a low voltage electric current.

In carrying out this part of the invention and in cases where mild or low grade steel shanks are to be electrically welded to the ends of the high grade or high speed steel bar, we may proceed as follows:—The bar may be formed with flat ends and shanks, which are to be attached to each end of the said bar and which may be parallel, are produced separately. The shanks having been located within the work holding clamps or conducting sockets of a suitable form of electrical welding and heating apparatus, the bar is positioned between the shanks and adjusted so as to produce the required alignment and electrical contact. The current for welding and the current for heating or tempering may be supplied either from different sources of supply, or a suitable transformer may be provided in cases where the current for both operations is obtained from a common source. The current suitable for welding is now applied and immediately the weld is effected and the two shanks are united to the ends of the double drill length the welding current is cut off and the heating current is switched on so as partially to anneal, or at least remove the stresses produced during the welding operation and finally to heat the double drill length to hardening temperature. After being suitably cooled off for hardening purposes the tempering is effected either by heating electrically or by treatment in the usual manner. The double drill length with its two shanks may now be ground and otherwise treated and, after being cut through the middle by means of an emery wheel or grind stone, the point and cutting edges are formed. The drills may be ground to a finish before or after the severing operation as desired.

In cases where the shanks and drills are being formed from the same bar of high grade steel, the bar after, if desired, effecting the milling or other machining operations, may be located within an electric heating apparatus, which may be of the rivet heating type or clamped between the conducting sockets or work holding clamps of an electric welding machine, and a current of low voltage and high amperage switched on so as to raise the fluted portion of the high grade steel throughout its length to hardening temperature. After cooling, the tempering may either be effected by reheating electrically or else by heating in the usual manner, the piece being ground, and, after being cut through the middle, pointed, and the cutting edges formed, each drill may be ground to a finish.

What I claim and desire to secure by Letters Patent of the United States is:—

1. A method of forming two drills from a steel bar of double drill length, which consists in hardening and tempering the same, cleaning up the outside diameter, thereafter severing the bar at the middle, pointing the severed ends, and forming the usual cutting edges.

2. A method of forming two drills from a high grade steel bar of double drill length, which consists in cutting a profile bar to double drill length, twisting the same throughout its length, flattening the ends, attaching mild steel shank portions to each end of the bar by electric welding, hardening the bar, cleaning up the outside diameter, thereafter severing the same at the middle, pointing the severed ends, and forming the usual cutting edges.

3. A method of forming two drills from a high grade steel bar of double drill length, which consists in twisting the same throughout its length, flattening the ends, attaching mild steel shank portions to each end of the bar by electric welding annealing and straightening the bar if necessary, turning the outside diameter, milling the flutes and thereafter hardening and tempering and cleaning up the outside diameter of the bar, the bar being then divided at the middle into two parts, the severed ends pointed and the usual cutting edges formed.

4. A method of manufacturing two drills from a high grade steel bar of double drill length, which consists in heating the bar for hardening purposes by means of a low voltage electric current, cleaning up the outside diameter, thereafter severing the bar into two parts, pointing the severed ends, and forming the usual cutting edges.

5. A method of manufacturing two drills from a high grade steel bar of double drill length, which consists in heating the bar for hardening and tempering purposes by means of a low voltage electric current, thereafter severing the bar into two parts, pointing the severed ends, forming the usual cutting edges, and cleaning up the outside diameter.

6. A method of forming two drills from a high-grade steel bar of double drill length, which consists in attaching a mild steel shank portion to each end of the bar, hardening the bar, cleaning up the outside diameter of the bar, thereafter severing the same at the middle, pointing the severed ends and forming the usual cutting edges.

ROBERT LOW SMITH.